Patented July 6, 1937

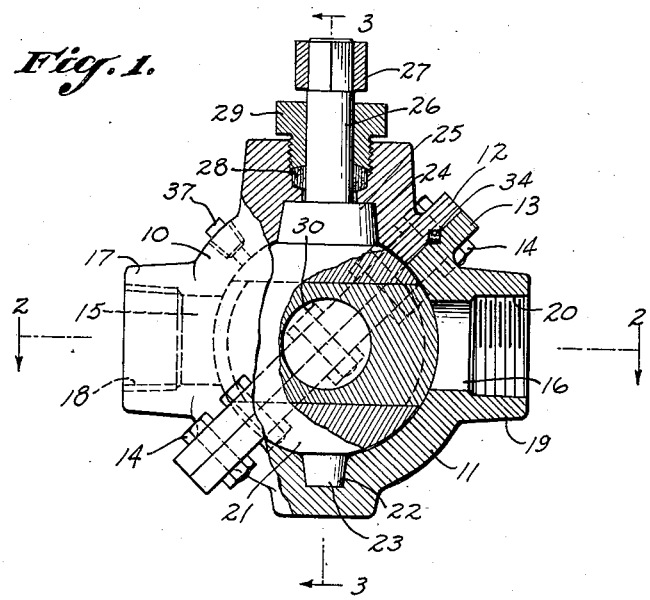
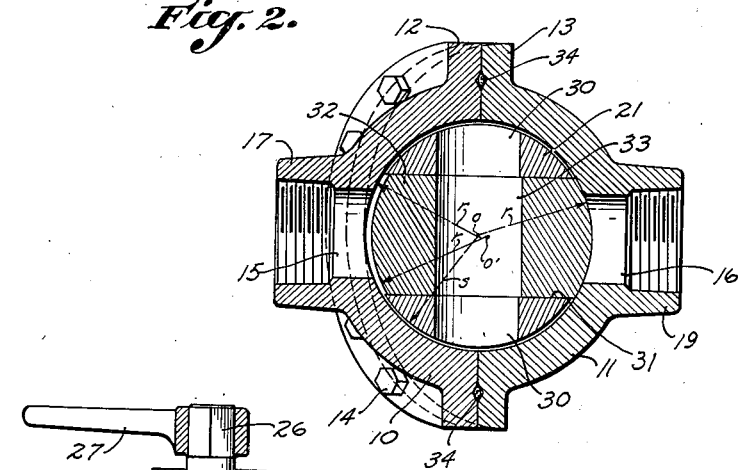
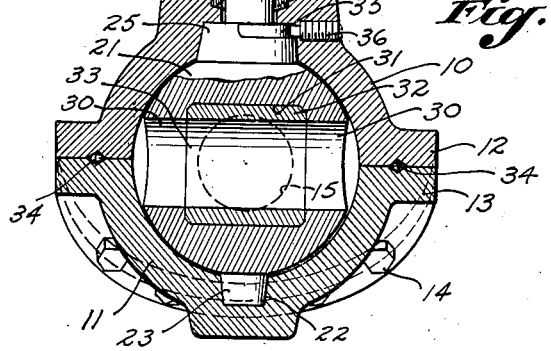

2,086,001

UNITED STATES PATENT OFFICE 2,086,001

VALVE

Wesley F. Shaw, Los Angeles, Calif.

Application August 2, 1935, Serial No. 34,411

5 Claims. (Cl. 251—102)

My invention relates to valves and particularly to quick opening and closing valves especially suitable for use under high fluid pressures.

An object of my invention is to provide a valve which may be opened or closed by turning through a quarter turn.

Another object of the invention is to provide a valve which seals itself against leakage when in the closed position and in which the seal becomes tighter as the pressure increases.

Another object is to provide a valve which continues to seal tightly against leakage even after long use has caused the valve parts to be worn and loose.

Still another object is to provide a valve which is compact and economical of metal, but yet is very strong for its weight.

These objects I attain in a manner which will be clear from consideration of the following description taken in connection with the accompanying drawing, of which:

Fig. 1 is an elevational view, partly in section, of my valve in the closed position.

Fig. 2 is a sectional view of the valve taken along the line 2—2 of Fig. 1 in the direction of the arrows as shown.

Fig. 3 is a sectional view of the valve taken along the line 3—3 of Fig. 1 in the direction of the arrow as shown.

In my valve, I have a substantially spherical housing consisting preferably of an upper housing member 10 and a lower housing member 11 provided respectively with cooperating flanges 12 and 13 which are secured tightly together by a series of bolts 14 disposed around the periphery of the flanges. The two members of the housing are so shaped that when they are united in this manner, they form an interior spherical cavity in which is rotatably placed the movable portions of the valve. The upper member 10 of the housing has a fluid passage 15 angularly disposed to the connecting flanges and leading from outside the valve into the spherical cavity, and the lower member 11 has a similar passage 16 leading from outside the valve into the spherical cavity and aligned with the passage 15. Projecting from the housing member 10 concentric with passage 15 is a tubular extension 17 having internal threads 18 adapted to receive a male pipe member in the fluid line to which the valve is to be fitted. In like manner the housing member 11 has a tubular extension 19 concentric with passage 16 and having internal threads 20 adapted to receive a male pipe member in the fluid line to which the valve is to be fitted.

The purpose of the valve is to permit or stop, at will, the flow of fluid between passages 15 and 16. For this purpose I provide in the spherical cavity within the housing a spherical core 21 which is rotatable about an axis substantially perpendicular to the passages 15 and 16, and which provides a communicating passage through the valve when in one position but which when turned through a quarter turn closes and seals the passages from one another in a manner to be presently described. The housing member 11 has a tapered socket 22 at its lower end into which fits a correspondingly tapered projection 23 on the bottom of the core 21. In a similar manner, the housing member 10 has a tapered socket 24 into which fits the correspondingly tapered projection 25 on the top of the spherical core 21. The projections 23 and 25 and their corresponding sockets are tapered in order to provide a large bearing surface and to facilitate assembly of the valve. A stem 26 forming a vertical extension of the core 21 passes out through the housing and has attached thereto at its upper end a handle 27 by means of which an operator may rotate the valve core 21. The upper housing member 10 has at its upper end the usual provision for packing 28 against which the packing nut 29 is screwed to pack the valve stem 26 against leakage where it passes out of the housing.

The core 21 has a fluid passage 30 therethrough perpendicular to the axis of turning of the core and so placed as to connect with passages 15 and 16 when the core 21 is turned through a quarter turn from the position in which it is shown in the drawing into the open position. The passage 30 is of about the same diameter as passages 15 and 16. Lying perpendicular to the fluid passage 30 and perpendicular to the axis of turning of the core 21 is a substantially square-shaped hole 31 running all the way through the core 21. Within this hole and being a sliding fit therein is the square plug 32 having spherically shaped ends of the same curvature as the housing. The square plug 32 has a fluid passage 33 through it aligned with the passage 30 of the core 21. It is obvious that when core 21 is rotated a quarter turn from the position shown, the passages 15, 30, 33, 30, and 16 are all aligned and form an open passage through the valve. This corresponds to the open position of the valve.

The drawing shows the valve in the closed position with the imagined condition of higher fluid pressure in passage 15 than in passage 16. This condition clearly brings out the purpose of the plug 32. When the core 21 and enclosed plug 32 are turned to the position shown, the plug 32 blocks the passage 15 and fluid pressure acts on the left face of the plug to force the plug through the core 21 and tightly up against the spherical housing adjacent the passage 16 which passage, in the imagined condition, would be the outlet passage. The greater the pressure, the tighter is plug 32 pressed against the housing. Inasmuch as the plug 32 is larger in all dimensions than the opening to the passage 16, this passage is completely sealed off.

In order to have sealing contact over all the area of the housing covered by the plug, the plug is preferably made to have on its end faces spherical surfaces of the same radius of curvature as that of the spherical housing on which they seat. The relation of the radii of the various spherical surfaces may be seen in Fig. 2, in which, however, the clearances are exaggerated for the sake of clearness. The point $o$ is the center of the spherical inside surface of the housing, which surface forms the wall of the cavity within which rotate the core 21 and plug 32. The radius of this housing surface is $r$. In order that the plug may match its seating surface, the radius of the plug's spherical surface shown contacting over passage 16 is also $r$ and its center, when the plug is in contacting position, is also at $o$. The center of the core's spherical surface is also at $o$ since it is intended to be rotated within the housing surface, but its radius $s$ is necessarily less than $r$ by the amount of clearance required for easy turning of the core within the housing. Since the plug 32 must turn with core 21, it is preferable that the plug also has the same clearance as the core, and this condition exists when the center line of the plug taken through the point $o$ and parallel to the direction of permissible movement of the plug has a length equal to the diameter $2s$ of the core 21. It will thus be observed that the center of the spherical surface on the left end of the plug 32 is not $o$ but is rather $o'$ which is to the right of $o$ a distance equal to $2(r-s)$.

It is obvious that if the higher pressure exists in passage 16 instead of in passage 15, the plug 32 will be forced to the left and against the spherical housing to cover and seal the passage 15. In other words, the efficiency of the valve is independent of the direction of flow.

It will now be clear why the flanges 12 and 13 are disposed at an angle of about 45° to both major axes of the valve. To place the flanges vertically the packing of the stem would be interfered with, and the construction would be clumsy. But to place the flanges horizontal would cause a joint to exist in the seat against which the plug 32 is pressed by fluid pressure. Placing the flanges transverse to both the inlet and outlet passages and also to the axis of rotation of the core, as shown, both these defects are avoided and a compact unit is obtained. To provide against leakage between the flanges, both flanges 12 and 13 have cut in them at the same radius a circumferential V groove, so that when a copper tube or wire 34 of suitable size is laid in the groove and the opposing flange is tightened against it until the flanges meet, the pressure of the flanges against the copper will be so great that leakage is prevented.

In the operation of the valve it is convenient to have definitely located positions of the core corresponding to open and closed conditions of the valve. For this purpose a groove 35 is cut in the side of projection 25 for slightly more than a quarter the way around, into which groove extends a screw 36 which is screwed into the housing member 10. When the core 21 is rotated counter-clockwise, as seen from above, from the position shown into the open position, the end of the groove 35 will come against screw 36; and when the core is rotated back in the opposite direction into the closed position again, as shown, the screw strikes against the other end of the groove 35. Thus, both open and closed positions are definitely located.

In use it is found desirable to lubricate the moving parts of the valve and to this end a grease plug 37 is fixed in the housing member 11, communicating with the interior spherical cavity.

My valve offers the advantage that it seals against high pressures but is still easy to turn. The greater the pressure, the tighter is the seal. My greatest advantages are derived from the employment of a fluid pressure operated sealing plug in the valve core and the spherical shape of the valve housing and movable surfaces inside. When the valve core is made in any other than spherical shape and hard use has caused wearing of the parts, the valve core tends to tilt about a horizontal axis when pressure is applied to it in the closed position, and makes impossible a satisfactory seating of the plug against the housing. With my spherical housing and spherical moving surfaces on the core and plug, however, the core and plug can tilt in any direction through any reasonable distance and the plug will still be able to seat perfectly on the housing. This is a feature of very great importance because it increases enormously the life of the valve, especially where the valve is required to handle gritty and abrasive substances which tend to cause wearing of the parts. The spherical shape is also of great advantage where the valve is used under high pressure, as the greatest strength of housing for a given weight of metal is obtained when a spherical shape is employed.

It is understood that various changes and modifications of design and construction may be made by those skilled in the art without departing from the spirit and scope of the invention, and I, therefore, wish to be limited only by the appended claims.

What I claim and desire to secure by Letters Patent is:

1. A valve comprising a housing providing a spherical cavity and aligned fluid inlet and outlet passages connecting with said cavity, a spherically surfaced core of less diameter than said cavity and rotatable in said cavity about an axis substantially perpendicular to said passages and having a communicating passage therethrough adapted to connect said inlet and outlet passages in the open position of said core within said housing, means located at each of the opposite ends of said core for maintaining the spherical surfaces of the core spaced from the wall of said cavity, and means mounted non-rotatably in said core but slidable therein in a direction transverse to said communicating passage and adapted to be forced by fluid pressure against said spherical housing to cover and seal said outlet passage when said core is in the closed position within said housing.

2. A valve comprising a housing providing a spherical cavity and aligned fluid inlet and outlet passages connecting with said cavity, a spherically surfaced core of less diameter than said cavity and rotatable in said cavity about an axis substantially perpendicular to said passages and having a communicating passage therethrough adapted to connect with said inlet and outlet passages in the open position of said core within said housing, means maintaining the spherical surfaces of said core spaced from the wall of said cavity, and a spherically ended plug mounted non-rotatably in said core but slidable therein in a direction transverse to said communicating passage and adapted to align with said inlet and outlet passages in the closed position of said core within said housing, said plug having a passage therethrough connected with said communicating passage, the length of said plug being substantially equal to the diameter of said core and the ends of said plug having a curvature substantially equal to that of the wall of said cavity.

3. A valve comprising a housing providing a spherical cavity and aligned fluid inlet and outlet passages connecting with said cavity, a spherically surfaced core of less diameter than said cavity and rotatable in said cavity about an axis substantially perpendicular to said passages and having a communicating passage therethrough adapted to connect said inlet and outlet passages in the open position of said core within said housing, means located at opposite ends of the core for maintaining the spherical surfaces of said core spaced from the wall of said cavity, a spherically ended plug mounted non-rotatably in said core but slidable therein in a direction transverse to said communicating passage and adapted to be forced by fluid pressure against said spherical housing to cover and seal said outlet passage when said core is rotated to the closed position within said housing, and means limiting the rotation of said core to the angle between said open and closed positions, said plug being of length less than the diameter of said cavity and having end surfaces of substantially the same curvature as the wall of said cavity.

4. A valve comprising a housing providing a spherical cavity and aligned fluid inlet and outlet passages connecting with said cavity, a spherically surfaced core of less diameter than said cavity and rotatable in said cavity about an axis transverse to said passages and having a communicating passage therethrough adapted to connect with said inlet and outlet passages in the open position of said core within said housing, means maintaining the spherical surfaces of said core spaced from the wall of said cavity, and a spherically ended plug of substantially rectangular cross-section mounted slidable in said core in a direction transverse to said communicating passage and adapted to align with said inlet and outlet passages in the closed position of said core within said housing, said plug having a passage therethrough connected with said communicating passage, the length of said plug being less than the diameter of said cavity and the ends of said plug having substantially the same curvature as the wall of said cavity.

5. A valve comprising a housing providing a spherical cavity and aligned fluid inlet and outlet passages connecting with said cavity, a spherically surfaced core rotatable in said cavity about an axis transverse to said passages and having a communicating passage therethrough adapted to connect with said inlet and outlet passages in the open position of said core within said housing, and a spherically ended plug mounted non-rotatably in said core but slidable therein in a direction transverse to said communicating passage and adapted to align with said inlet and outlet passages in the closed position of said core within said housing, said plug having a passage therethrough connected with said communicating passage, the length of said plug being less than the diameter of said cavity and the ends of said plug having substantially the same curvature as the wall of said cavity.

WESLEY F. SHAW.